United States Patent [19]
Alford et al.

[11] Patent Number: 5,761,067
[45] Date of Patent: Jun. 2, 1998

[54] EVALUATING A TOOTHED WORK PIECE FOR MACHINING BASED ON ACCUMULATED PITCH VARIATION

[75] Inventors: Scott R. Alford, Webster; Brian J. Baldeck, Mumford; Robert S. Crandall, Macedon, all of N.Y.

[73] Assignee: The Gleason Works, Rochester, N.Y.

[21] Appl. No.: 811,088

[22] Filed: Mar. 3, 1997

Related U.S. Application Data

[60] Provisional application No. 60/014,345 Mar. 29, 1996.

[51] Int. Cl.$^6$ .............................. G06F 19/00; G06G 7/64; G06G 7/66
[52] U.S. Cl. .............................. 364/474.02; 364/474.06; 364/474.16; 364/476.17; 364/476.18
[58] Field of Search .............................. 364/474.02, 474.06, 364/474.35, 474.17, 474.16, 474.18; 51/165, 165.71; 451/1

[56] References Cited

U.S. PATENT DOCUMENTS

| | | | |
|---|---|---|---|
| 4,755,950 | 7/1988 | Rao | 364/474 |
| 5,136,522 | 8/1992 | Loehrke | 364/474.06 |
| 5,175,962 | 1/1993 | Pedersen | 51/165 |
| 5,237,779 | 8/1993 | Ota | 51/165.71 |
| 5,239,479 | 8/1993 | Nolting et al. | 364/474.16 |
| 5,297,055 | 3/1994 | Johnstone | 364/474.37 |
| 5,580,298 | 12/1996 | Stadtfeld | 451/1 |

FOREIGN PATENT DOCUMENTS

| | | | |
|---|---|---|---|
| 2587254 | 3/1987 | France | B23F 19/08 |

OTHER PUBLICATIONS

Smith, Robert et al., *Detection of "Hidden Runout"*, AGMA Technical Paper, 95FTM1, Alexandria, Virginia, Oct., 1995.
Patent Abstracts of Japan, vol. 016, No. 510, (M-1328), Oct. 21, 1992, Japanese Patent Application Publication No. 04-189418 published Jul. 7, 1992, Nissan Motor Co. Ltd.

*Primary Examiner*—Reba I. Elmore
*Assistant Examiner*—Ramesh Patel
*Attorney, Agent, or Firm*—Robert L. McDowell; Ralph E. Harper

[57] ABSTRACT

A method of evaluating a toothed workpiece for machining according to a predetermined machining process. A workpiece spindle is rotated to bring selected leading and/or trailing tooth flanks each into a predetermined position relative to a probe to generate a signal indicative of the instantaneous rotational position of the spindle and the instantaneous rotational spindle positions corresponding to each generated signal are recorded. Theoretical spindle positions corresponding to each selected tooth flank are provided, and the difference between respective recorded spindle positions and the theoretical spindle positions for each selected tooth flank is calculated to yield a measured error value. The maximum and minimum measured error values for leading tooth flanks and/or trailing tooth flanks are selected and a maximum accumulated pitch variation ($P_V$) is calculated for the leading tooth flanks and/or trailing tooth flanks. The maximum accumulated pitch variation ($P_V$) is compared to predetermined pitch variation tolerance limits comprising an abort tolerance ($T_A$) and a modified process tolerance ($T_M$) whereby the predetermined machining process is aborted if $P_V \geq T_A$, the predetermined machining process is modified if $T_M \leq P_V \leq T_A$, and the predetermined machining process is carried out if $P_V < T_M$.

9 Claims, 3 Drawing Sheets

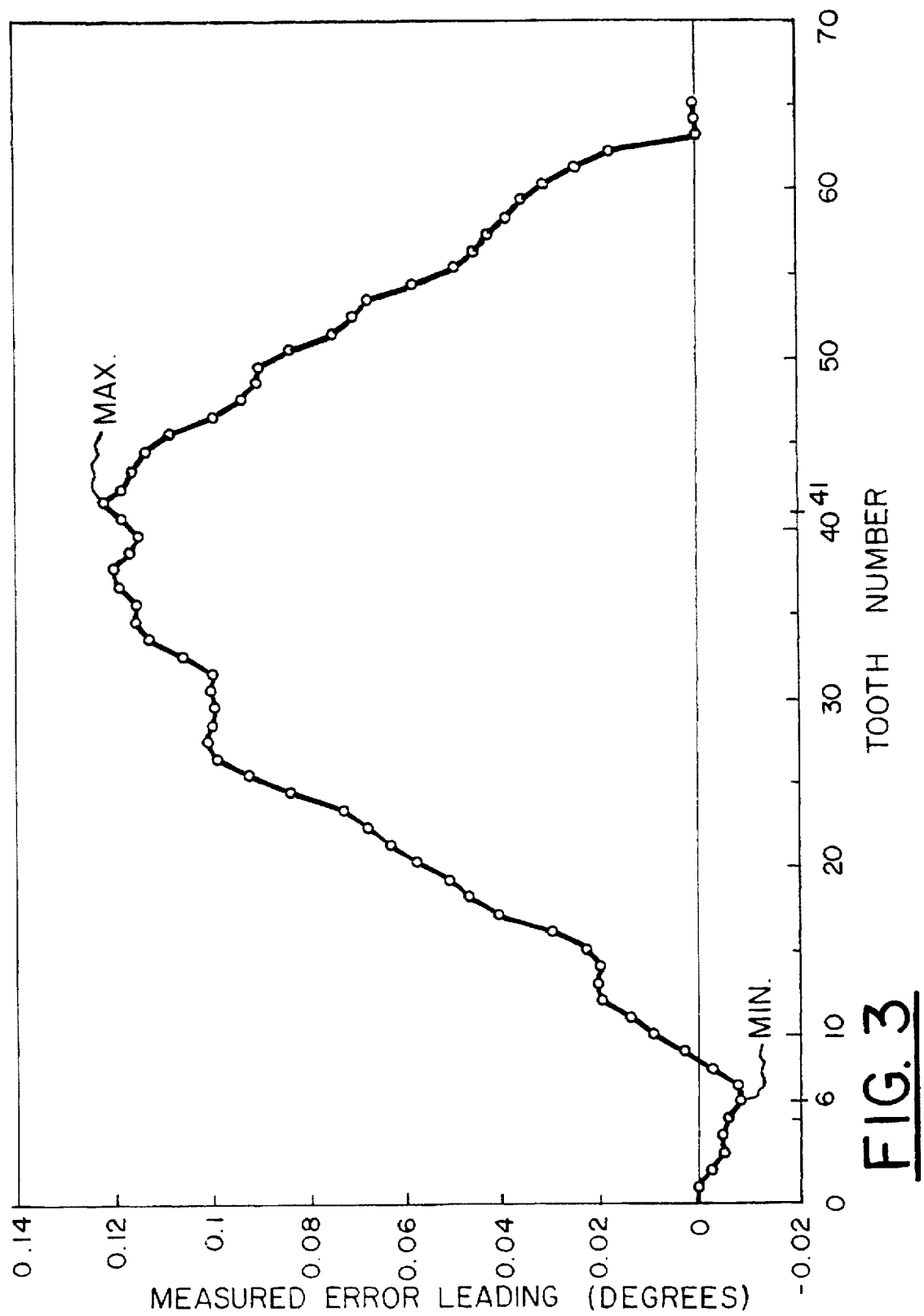

5,761,067

EVALUATING A TOOTHED WORK PIECE FOR MACHINING BASED ON ACCUMULATED PITCH VARIATION

RELATED APPLICATIONS

This application is Provisional Application No. 60/014,345 filed Mar. 29, 1996.

FIELD OF THE INVENTION

The present invention is directed to machining of toothed articles such as gears and the like. Particularly, the present invention relates to a method of evaluating a workpiece to determine the appropriate procedure to be followed in machining the workpiece.

BACKGROUND OF THE INVENTION

In machining processes for toothed workpieces such as finish grinding processes for spur and helical gears or bevel and hypoid gears, the presentation of a succession of workpieces for machining provides a variety of workpiece geometries to be machined by a tool, such as, for example, a threaded grinding wheel for spur or helical gears.

The geometry of a workpiece prior to final machining can be affected in many ways. For example, workpiece geometry is influenced by runout, cutting blade sharpness and positioning accuracy in a cutting tool, the mounting position of the workpiece on the cutting machine spindle, the precision of machine axes motions of the cutting machine itself, distortions caused by heat treating subsequent to cutting, or, assembly errors when the workpiece is fastened to another rotational member. Inaccuracies in a gear degrade its quality and performance and can lead to undesirable stresses under load, transmission errors, noise and vibrations when rotating.

Regardless of how inaccuracies are introduced into a workpiece prior to final machining, the final machining process must contend with a range of workpiece conditions with the expectation that the workpiece, after final machining, will meet the geometrical requirements of a finished workpiece. In some instances, attempting to grind a workpiece with excessive runout, whereby excessive stock material is present on a portion of the tooth flanks, can lead to burned tooth flank surface finish and accelerated wear on the tool thus requiring more frequent dressings and diminishing the useful life of the tool. If too little stock exists on the tooth flank surfaces or runout is excessive, some surfaces of the teeth will not be properly finished by the machining process.

One approach to analyze gear quality is to detect the amount of runout present in the gear. Runout is a measure of the radial eccentricity of a gear, but runout may also be of the type known as "hidden runout" which is identified by the accumulated pitch variation present in a gear. Hidden runout may exist apart from radial runout. A discussion of hidden runout and its detection by use of accumulated pitch variation data is discussed by Smith, Robert, et al., *Detection of "Hidden Runout"*, AGMA Technical Paper, 95FTM1, October, 1995.

Another method of analyzing a workpiece for errors due to runout and heat treat distortions is disclosed in U.S. Pat. No. 5,136,522 to Loehrke. A gear is rotated past a non-contacting probe and the work spindle rotational positions of leading and trailing flanks are recorded, compared to theoretical spindle positions, and measured error values based on the difference between actual and theoretical readings are computed for each set of leading and trailing flanks. The measured error values for each set are then analyzed using fourier transform techniques to generate a first harmonic comprising a set of modified error values indicative of runout. The modified error values are subtracted from the measured error values to yield a set of adjusted error values indicative of distortions due to other factors such as heat treating. The largest and smallest modified error values are utilized to simulate an effective tooth spacing which is compared to the desired tooth spacing and a correction value is generated by which the angular position of the workpiece spindle is adjusted to ensure accurate machining.

It is an object of the present invention to provide a process wherein tool wear and the number of rejected workpieces are reduced.

It is a further object of the present invention to provide a process wherein a toothed workpiece is evaluated to determine the suitability of the workpiece flanks for subsequent machining and providing alternatives or modifications to the intended machining process depending on the results of the evaluation.

In this way, a given workpiece can be determined to be suitable for a predetermined machining operation, or alternatively, the machining operation can be modified to bring the workpiece within an acceptable range for machining without having to reject the workpiece.

SUMMARY OF THE INVENTION

The present invention comprises a method of evaluating a toothed workpiece for machining according to a predetermined machining process. The toothed workpiece includes a plurality of teeth with each tooth having a leading flank and a trailing flank with respect to a direction of rotation.

The inventive method comprises mounting the workpiece to a rotatable spindle on a machine tool and providing a probe means positioned whereby a signal is produced when a leading or trailing flank of the workpiece is located in a predetermined position relative to the probe, the signal produced by the probe being indicative of the instantaneous rotational position of the spindle.

The workpiece spindle is rotated to bring selected leading and/or trailing tooth flanks each into the predetermined probing position to generate a signal, and the instantaneous rotational spindle positions corresponding to each generated signal are recorded. Theoretical spindle positions (relative to the first tooth flank) corresponding to each selected tooth flank are provided and measured error values are determined by the difference between respective recorded spindle positions and the theoretical spindle positions for each selected tooth flank. The measured error values are recorded.

The maximum and minimum measured error values for leading tooth flanks and/or trailing tooth flanks are selected and a maximum accumulated pitch variation ($P_V$) is calculated for the leading tooth flanks and/or trailing tooth flanks. The maximum accumulated pitch variation ($P_v$) is compared to predetermined pitch variation tolerance limits comprising an abort tolerance ($T_A$) and a modified process tolerance ($T_M$) whereby the predetermined machining process is aborted if $P_V \geq T_A$, the predetermined machining process is modified if $T_M \leq P_V < T_A$, and the predetermined machining process is carried out if $P_V < T_M$.

BRIEF DESCRIPTION OF THE DRAWINGS

FIG. 3 graphically illustrates the measured error values of the leading tooth flanks of a workpiece.

DETAILED DESCRIPTION OF THE PREFERRED EMBODIMENTS

The details of the present invention will be discussed with reference to the preferred embodiment.

The present inventive method may be carried out on any machine tool capable of probing a workpiece and adjusting the relative rotational position between the tool and workpiece in response to information acquired and manipulated as a result of the probing.

Figure 1:
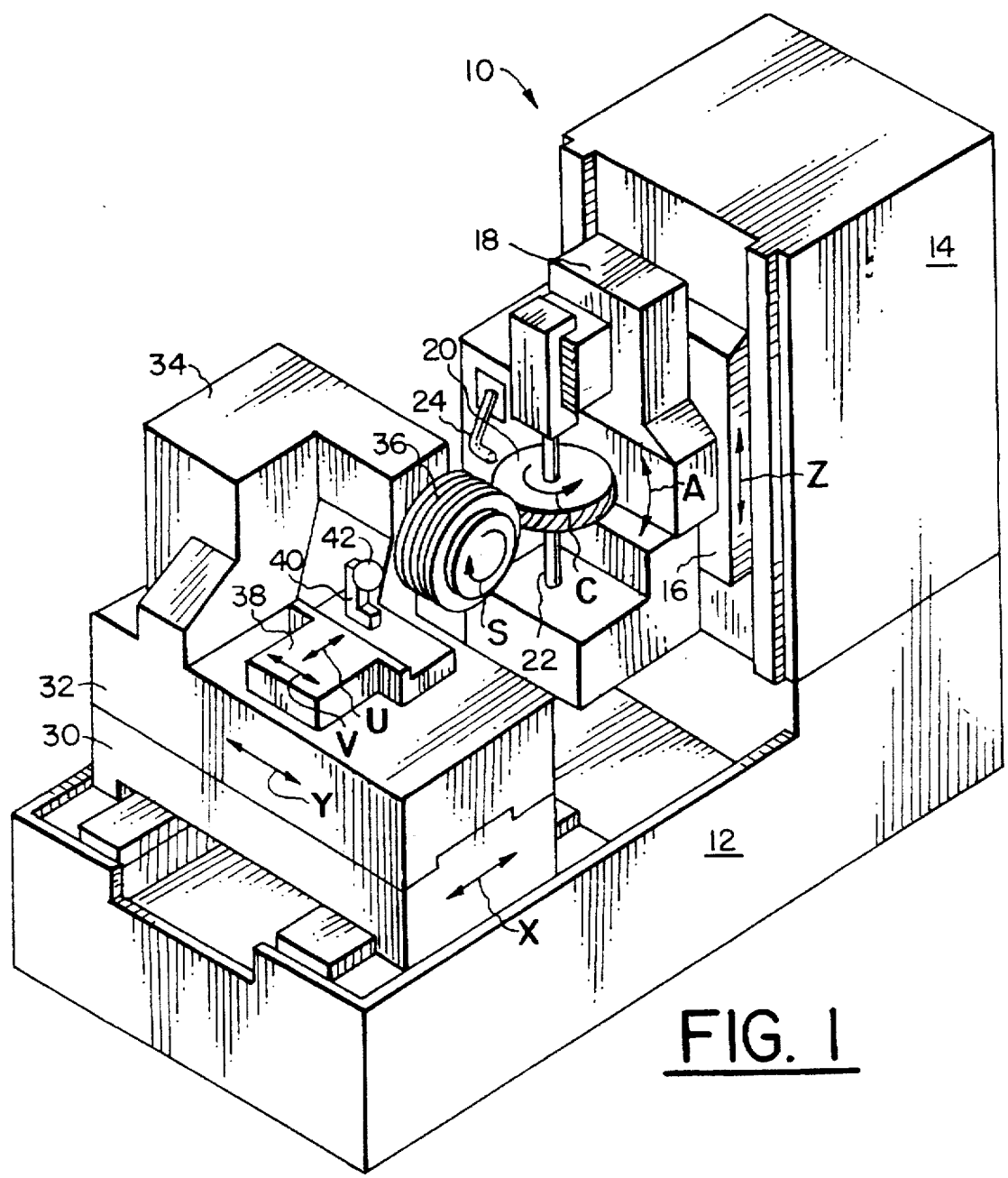
FIG. 1 schematically illustrates a machine tool on which the present invention may be carried out.

FIG. 1 schematically illustrates one type of machine tool as set forth above comprising a computer controlled machine 10 for grinding spur and helical gears with a threaded grinding wheel. Machines of this type are known in the art and are readily available.

The machine includes a base 12 and a work column 14. A work table slide 16 is arranged on the work column 14 for linear movement along an axis (Z-axis). Mounted for rotation to work table slide 16 is work support 18 which is rotatable about an axis (A-axis) for setting the proper helix angle required for grinding a particular gear. A work gear 20 is mounted to a rotatable spindle 22 by appropriate work holding equipment for rotation about the work gear axis (C-axis). Also shown is non-contact probe 24 positioned adjacent the tooth surfaces of workpiece 20. Non-contacting probes are well known using electric or magnetic fields, air jets, or light beams to generate trigger signals whenever the flank of a workpiece passes within some predetermined distance from the probe.

Also located on base 12 are a pair of tool slides 30 and 32. Tool slide 30 enables movement of the tool along the length of the base (X-axis) and tool slide 32 enables movement of the tool across the width of the base (Y-axis). Machine axes X, Y, and Z are mutually perpendicular to one another.

Attached to tool slide 32 is tool support 34 to which tool 36 is mounted for rotation about a tool axis (S-axis).

A dressing wheel table 38 is located on tool slide 32 and is movable along perpendicular dressing axes (U-axis and V-axis). A dressing tool support 40 is mounted to dressing wheel table 38 and a rotary dressing tool 42 is mounted for rotation to dressing tool support 40. Dressing tool support 40 is angularly adjustable on table 38 in order to position the dressing tool 42 to the lead angle of the grinding wheel 36. V-axis motion is utilized to traverse the dressing tool 42 along the width of the grinding wheel 36 and U-axis motion is used for infeeding of the dressing tool to position the dressing tool 42 at contact points along the profile of the grinding thread surface.

Movement about or along the described axes is imparted by separate drive motors (not shown). The movable machine components named above are capable of independent movement with respect to one another and may move simultaneously with one another. Each of the respective motors is associated with either a linear or rotary encoder (not shown) as part of a computer numerical control (CNC) system which governs the operation of the drive motors in accordance with instructions input to a computer (not shown). The encoders provide feedback information to the computer concerning the actual positions of each of the movable axes.

The method comprises mounting a toothed workpiece 20, such as a helical gear, to the rotatable spindle 22 on grinding machine 10 and providing the probe 24 positioned whereby a signal is produced when a predetermined height position of a leading or trailing flank of the workpiece is located in a predetermined position relative to the probe 24. The signal produced by the probe 24 being indicative of the instantaneous rotational position of the spindle. The workpiece spindle 22 is rotated to bring selected leading and/or trailing tooth flanks each into the predetermined probing position to generate a signal and the instantaneous rotational spindle positions corresponding to each generated signal are recorded. Probing in this manner is known from previously mentioned U.S. Pat. No. 5,136,522 the disclosure of which is hereby incorporated by reference.

Figure 2:
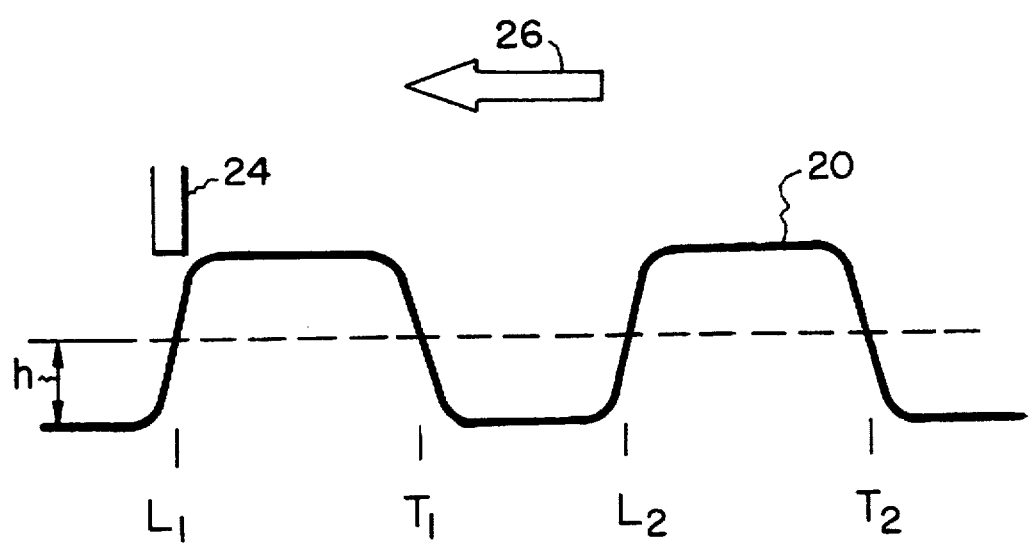
FIG. 2 illustrates the probing method of the present invention.

FIG. 2 illustrates probing the tooth flanks of workpiece 20 with non-contacting probe 24. As workpiece 20 is rotated in the direction of arrow 26, a position at a predetermined flank height "h" (usually the mid-height point of the tooth) on a first leading tooth flank $T_1$ passes probe 24 and a signal is generated to record the rotational position of the work spindle 22. As the workpiece continues to move past probe 24, the first trailing flank $T_1$ would also trigger probe 24 to generate a signal to again record the instantaneous work spindle rotational position. Rotation of the workpiece 20 continues as the next leading flank, $L_2$, and trailing flank, $T_2$, pass the probe 24 to trigger recording of the respective work spindle positions. Rotation of workpiece 20 continues until all teeth have passed probe 20 and the work spindle positions for all leading and trailing flanks have been recorded.

It is to be understood that although it is preferred to probe all teeth of workpiece 20 as stated above, the present invention may be practiced with as few as four, preferably equidistantly spaced, leading and trailing tooth flanks.

The measured work spindle rotational positions for the leading and/or trailing flanks are then compared to corresponding theoretically correct flank positions. The first measured leading and/or trailing tooth flanks function as the "zero" position and the theoretically correct flank positions of all subsequent flanks relative to the first-scanned tooth flanks are generated based upon the first measured flank. The difference between respective measured spindle positions and theoretically correct positions are determined to yield a measured error value for each probed flank.

As an example, a left-hand helical gear having 65 teeth and a pitch radius of 53 mm was mounted to a work spindle on a grinding machine such as shown in FIG. 1. The gear was rotated past a non-contact type probe and the leading and trailing flanks of all teeth were probed at a consistent tooth height "h" at about the mid-height of the teeth. The positional information obtained by probing, along with the respective theoretical position data relative to the first leading and trailing flanks and calculated measured error values for a portion of the teeth, are illustrated in the Tables below. Position and Error values are listed in degrees. FIG. 3 graphically easured error for the leading flanks of all 65 teeth.

TABLE I

Leading Flanks

| Tooth # | Measured Position | Theoretical Position | Measured Error Value |
|---|---|---|---|
| 1 | 2.54710 | 2.54710 | 0.00000 |
| 2 | 8.08280 | 8.08556 | −0.00276 |
| 6 | 30.23105 | 30.23941 | −0.00836 (min.) |
| 11 | 57.94550 | 57.93172 | 0.01378 |

TABLE I-continued

Leading Flanks

| Tooth # | Measured Position | Theoretical Position | Measured Error Value |
|---|---|---|---|
| 16 | 85.65400 | 85.62402 | 0.02998 |
| 21 | 113.37950 | 113.31633 | 0.06317 |
| 26 | 141.10825 | 141.00864 | 0.09961 |
| 31 | 168.80130 | 188.70095 | 0.10035 |
| 36 | 196.51285 | 196.39325 | 0.11960 |
| 41 | 224.20815 | 224.08556 | 0.12259 (max.) |
| 46 | 251.87825 | 251.77787 | 0.10038 |
| 51 | 279.54600 | 279.47018 | 0.07852 |
| 56 | 307.20855 | 307.16248 | 0.04607 |
| 61 | 334.87985 | 334.85479 | 0.02506 |
| 65 | 357.00980 | 357.00864 | 0.00116 |

TABLE II

Trailing Flanks

| Tooth # | Measured Position | Theoretical Position | Measured Error Value |
|---|---|---|---|
| 1 | 5.12595 | 5.12595 | 0.00000 |
| 2 | 10.65865 | 10.66441 | −0.00576 |
| 6 | 32.80460 | 32.81826 | −0.01366 (min.) |
| 11 | 60.50610 | 60.51057 | −0.00447 |
| 16 | 88.21600 | 88.20287 | 0.01313 |
| 21 | 115.93230 | 115.89518 | 0.03712 |
| 26 | 143.66035 | 143.58749 | 0.07286 |
| 31 | 171.35780 | 171.27980 | 0.07800 |
| 36 | 199.06770 | 198.97210 | 0.09560 |
| 41 | 226.77245 | 226.66441 | 0.10804 (max.) |
| 46 | 254.44735 | 254.35872 | 0.09063 |
| 51 | 282.11825 | 282.04903 | 0.06722 |
| 56 | 309.78190 | 309.74133 | 0.04057 |
| 61 | 337.44915 | 337.43384 | 0.01551 |
| 65 | 359.58870 | 359.58749 | 0.00121 |

The maximum and minimum measured error values for leading tooth flanks and/or trailing tooth flanks are selected. Tooth #6 exhibits the minimum measured error value of −0.00836 for the leading flank and −0.01337 for the trailing flank. Tooth #41 exhibits the maximum measured error value of 0.12259 for the leading flank and 0.10804 for the trailing flank.

Maximum accumulated pitch variation ($P_v$) of the leading tooth flanks and/or trailing tooth flanks is calculated utilizing any known method, the following equation being preferred:

$$P_v = [E_{max} - E_{min}] \times (\pi/180) \times (R_p)_{work}$$

where $E_{max}$=maximum measured error value (degrees), $E_{min}$=minimum measured error value (degrees), $(R_p)_{work}$=pitch radius of workpiece (inches or mm).

Thus, for the leading flanks in the example above, the maximum accumulated pitch variation is determined as:

$P_v = [0.12259 - (-0.00836)] \times (\pi/180) \times 53$ mm $P_v = 0.12118$ mm

As an alternative, the amount of runout for the leading and/or trailing tooth flanks may be calculated using known techniques (such as fourier transformation, for example) and the results analyzed according to the procedure described below.

The maximum accumulated pitch variation ($P_v$) is compared to predetermined accumulated pitch variation tolerance limits comprising a process-abort tolerance ($T_A$) and a modified-process tolerance ($T_M$) whereby the predetermined machining process is aborted if $P_v \geq T_A$, the predetermined machining process is modified if $T_M \leq P_v < T_A$, and the predetermined machining process is carried out if $P_v < T_M$. Workpieces with $P_v$ values equal to or in excess of the abort tolerance TA have considerable runout such that no amount of grinding can bring the condition of the workpiece to an acceptable form and therefore, the workpiece is rejected. Workpieces with $P_v$ values less than the modified-process tolerance $T_M$ exhibit little or no runout and as such can be machined by relatively fast standard grinding cycles programmed into the machine tool computer. If the $P_v$ value exists in the range of from equal to or greater than $T_M$ to less than $T_A$, a significant amount of runout is present but with a modification of the standard machining cycle, the runout condition can be effectively addressed and the workpiece can be brought to an acceptable form.

In modifying a machining process or cycle, several aspects of the process may be changed. For example, any or all of the following process parameters may be modified: one or more additional machining passes or strokes may be added, the amount of stock material removed per stroke may be altered, the infeed position of one or more strokes may be changed, the amounts of incremental shift and/or continuous shift may be modified, the grinding wheel speed, and, the stroke rate may be adjusted.

In the above example, $P_v = 0.12118$, the abort tolerance $T_A = 0.175$ and the modified process tolerance $T_M = 0.09$. Therefore, given that $P_v$ lies between the process-abort limit $T_A$ and the process-modify limit $T_M$, more stock material exists on the tooth flanks than can be adequately removed by a standard grinding cycle and therefore, the actual process utilized to grind the gear was a modification of the predetermined standard grinding process for this type of gear. Specifically, in the present example, an additional grinding stroke was added to reduce wear on the grinding wheel as the excess stock material was removed.

It is to be understood that the tolerance limits $T_M$ and $T_A$ will vary for different sizes and types of gears. Generally, the tolerance limits can be determined by obtaining the final required gear quality specification runout amount for a particular gear (such as AGMA, DIN, JIS or equivalent published standards or user specified standards) and multiplying this amount by about 3 to obtain the process-modify tolerance $T_M$ and by about 6.5 to obtain the process-abort tolerance $T_A$.

If the workpiece being probed is a workpiece intended for stock-dividing the machine, that is, for "teaching" the machine tool the positioning of the tool relative to the workpiece, the above tolerances should be tightened since usually a closer tolerance gear (low runout, little heat treat distortion, and fewer assembly errors) is desired for stock-dividing operations.

If desired, average maximum and minimum error values may be utilized to calculate the maximum accumulated pitch variation. In this instance, the maximum and minimum error values and one or more adjacent flank readings are averaged to obtain the maximum or minimum error value. For example, tooth #6 is the minimum measured error value in the above example and if an average error value is desired, the measured error values of teeth #4 through #8 could be averaged to obtain a minimum error value for either leading or trailing flank.

It should be noted although the minimum and maximum error values in the above example occur on the same tooth for both leading and trailing flanks (#6 and #41 respectively), this is not always the case. Minimum and maximum values for leading and trailing flanks may occur on different teeth although usually the teeth will be near or adjacent to one another.

Although the example discloses two tolerance limits, it is to be understood that any number of tolerance values may be included resulting in several ranges ($T_O$-$T_1$-$T_2$- ... $T_n$) with each range having specific process modifications assigned to it.

While the present inventive process has been discussed with reference to helical gears, the invention is not limited thereto but is intended to be applicable to any toothed articles such as spur, bevel, and hypoid gears. Furthermore, the present invention is not limited to probing with non-contacting type probes but may also be effectively carried out with contact type probes.

The present invention represents an enhancement to the prior art approach of grind-or-scrap by providing the flexibility to machine heretofore non-machinable workpieces and/or to extend the useful life of a tool by adapting a process such that tool wear is lessened.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims

What is claimed is:

1. A method of evaluating a toothed workpiece for machining according to a predetermined machining process, said toothed workpiece having a plurality of teeth with each tooth having a leading flank and a trailing flank in a direction of rotation, said method comprising:

mounting said workpiece to a rotatable spindle on a machine tool, providing a probe means positioned whereby a signal is produced when a leading or trailing flank of said workpiece is located in a predetermined position relative to said probe, said signal being indicative of the instantaneous rotational position of said spindle, rotating said spindle to bring selected leading and/or trailing tooth flanks each into said predetermined position with respect to said probe to generate said signal, recording said instantaneous rotational spindle positions corresponding to each generated signal, providing theoretical spindle positions corresponding to each said selected tooth flank, calculating measured error values as the difference between respective recorded spindle positions and said theoretical spindle positions for each said selected tooth flank, recording said measured error values for each selected tooth flank, selecting the maximum and minimum measured error values for said leading tooth flanks and/or said trailing tooth flanks, calculating a maximum accumulated pitch variation ($P_V$) for said leading tooth flanks and/or said trailing tooth flanks, comparing said maximum accumulated pitch variation ($P_V$) to predetermined pitch variation tolerance limits comprising an abort tolerance ($T_A$) and a modified process tolerance ($T_M$) whereby said predetermined machining process is aborted if $P_V \geq T_A$, said predetermined machining process is modified if $T_M \leq P_V < T_A$, and said predetermined machining process is carried out if $P_V < T_M$.

2. The method of claim 1 wherein said probe means comprises a non-contact probe.

3. The method of claim 1 wherein said probe means comprises a contact probe.

4. The method of claim 1 wherein said maximum accumulated pitch variation ($P_V$) is calculated according to the equation:

$$P_V = [E_{max} - E_{min}] \times (\pi/180) \times (R_p)_{work}$$

where $E_{max}$=maximum measured error value, $E_{min}$=minimum measured error value, $(R_p)_{work}$=pitch radius of workpiece.

5. The method of claim 4 wherein $E_{max}$ and $E_{min}$ comprise average measured error values.

6. The method of claim 1 wherein said toothed workpiece is a spur or helical gear.

7. The method of claim 1 wherein said toothed workpiece is a bevel or hypoid gear.

8. The method of claim 6 wherein said spur or helical gear comprises a gear for stock dividing said machine tool.

9. The method of claim 1 wherein said machine tool comprises a grinding machine having a threaded grinding wheel.

* * * * *